(12) United States Patent
Chen et al.

(10) Patent No.: US 8,934,017 B2
(45) Date of Patent: Jan. 13, 2015

(54) SYSTEM AND METHOD FOR AUTOMATIC CAMERA PLACEMENT

(75) Inventors: Henry Chen, Beijing (CN); Hao Bai, Beijing (CN); Tom Plocher, Hugo, MN (US); Hari Thiruvengada, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 584 days.

(21) Appl. No.: 13/150,965

(22) Filed: Jun. 1, 2011

(65) Prior Publication Data

US 2012/0307067 A1 Dec. 6, 2012

(51) Int. Cl.
*H04N 7/18* (2006.01)
*G08B 13/196* (2006.01)

(52) U.S. Cl.
CPC .......... *H04N 7/181* (2013.01); *G08B 13/19641* (2013.01)
USPC .......................................... 348/159

(58) Field of Classification Search
CPC ................................. G08B 13/19641
USPC ..................... 348/159, 46, 154, 50, 143, 169; 382/276; 345/423; 386/278
See application file for complete search history.

(56) References Cited

U.S. PATENT DOCUMENTS

| 7,307,655 | B1 | 12/2007 | Okamoto et al. | |
| 8,284,254 | B2* | 10/2012 | Romanowich et al. | 348/154 |
| 2002/0039454 | A1* | 4/2002 | Hunter et al. | 382/276 |
| 2004/0075739 | A1* | 4/2004 | Wada | 348/143 |
| 2004/0201587 | A1 | 10/2004 | Mizusawa | |
| 2005/0253924 | A1 | 11/2005 | Mashitani | |
| 2012/0197600 | A1 | 8/2012 | Bai et al. | |

FOREIGN PATENT DOCUMENTS

| CN | 1696978 A | 11/2005 |
| CN | 101894369 A | 11/2010 |

OTHER PUBLICATIONS

"International Application Serial No. PCT/CN2011/000983, International Search Report mailed Jan. 29, 2012", 4 pgs.
"International Application Serial No. PCT/CN2011/000983, Written Opinion mailed Jan. 29, 2012", 5 pgs.
Erdem, U.M., et al., "Automated camera layout to satisfy task-specific floor plan-specific coverage requirements". *Computer Vision and Image Understanding*, 103, (2006), 156-169.

* cited by examiner

*Primary Examiner* — Dave Czekaj
*Assistant Examiner* — Berteau Joisil
(74) *Attorney, Agent, or Firm* — Schwegman Lundberg & Woessner, P.A.

(57) ABSTRACT

A system for automatically determining the placement of cameras receives data relating to a plurality of polygons. T polygons represent one or more of a surveillance area, a non-surveillance area, a blank area, and an obstacle. The system selects one or more initial cameras, including one or more initial camera positions, initial camera orientations, and initial camera features, wherein the initial camera positions and the initial camera orientations cause one or more fields of view of the initial cameras to cover at least a part of the surveillance area. The system alters one or more of a number of cameras, an orientation of the cameras, a location of the cameras, a type of the cameras, and a crossover of two or more cameras. The system uses a fitness function to evaluate all of the cameras and all of the camera positions, and selects one or more cameras and the locations and orientations of the one or more cameras as a function of the fitness function.

20 Claims, 12 Drawing Sheets

SYSTEM AND METHOD FOR AUTOMATIC CAMERA PLACEMENT

TECHNICAL FIELD

The present disclosure relates to a system and method for automatic camera placement.

BACKGROUND

The surveillance and monitoring of a building, a facility, a campus, or other area can be accomplished via the placement of a variety of cameras throughout the building, the facility, the campus, or the area. However, in the current state of the art, it is difficult to determine the most efficient and economical uses of the camera resources at hand.

DETAILED DESCRIPTION

In a surveillance situation, several regions of interest could be specified in a building or a facility and several types of cameras with certain parameters and costs could be selected. In an embodiment, an aim is to select some cameras and place them at some positions and orient them with some angles to cover these regions so as to have a maximum coverage rate and a minimum cost. This can be referred to as the camera placement problem.

To solve the camera placement problem, some optical camera parameter definitions should be outlined. Real cameras could be defined by the following parameters. The field of view (FoV) defines the maximum volume visible from a camera. It is determined by the apex angles of the visible pyramidal region. The FoV can be measured in radians, and is illustrated at 115 in the diagram 100 of FIG. 1. The FoV 115 in FIG. 1 results in a surveillance area 120.

The spatial resolution (SR) of a camera is the ratio between total number of pixels of the object on the image and the object's size. A given spatial resolution requirement results from the distance between the object and the camera.

Figure 1:
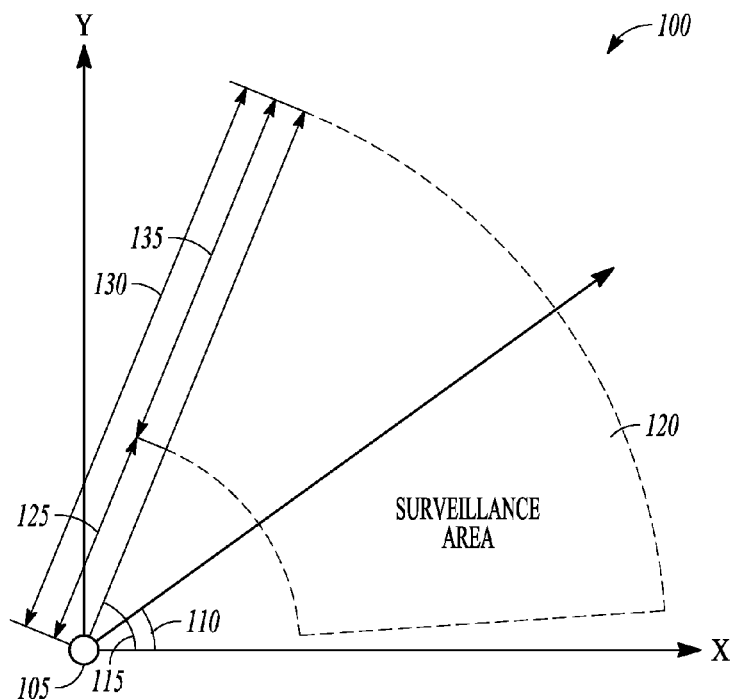
FIG. 1 illustrates the parameters of an optical camera.

The depth of field (DoF) is the distance between the nearest and farthest objects that appear in acceptably sharp focus in an image. Two parameters are defined in connection with the DoF, the farthest depth (FD) and the nearest depth (ND). The DoF 135, nearest depth 125, and farthest depth 130 are illustrated in FIG. 1. From FIG. 1, one can see that the DoF=FD−ND.

The cost of a particular camera includes the price of the camera, installation costs, and so on. A camera that has a larger DoF and FoV should have a higher cost.

Each camera is defined by a set of parameters, and there are many types of cameras available. Each different camera has a different lens type, element type, etc. Normally, three types of cameras are a fixed perspective camera, a pan-tilt-zoom (PTZ) camera, and an omnidirectional camera. A fixed perspective camera, once mounted in place, has a fixed position, orientation, and focal length. A fixed perspective camera has a small DoF and FoV because of its fixed focal length. A PTZ camera can be rotated and has an adjustable focal length (zoom). Consequently, a PTZ camera has a larger DoF and FOV than a fixed perspective camera. An omnidirectional camera has a $2\pi$ FoV.

If a vector Pi defines a camera I, then it comprises two sub vectors PiI and PiE. PiI represents the intrinsic parameters of the camera I while PiE represents the extrinsic parameters of the camera I. Intrinsic parameters are given above like FoV, SR, and DoF. Extrinsic parameters include camera location and camera orientation. Camera location refers to the installation of a camera at a certain position. In an embodiment, a Cartesian coordinate system is used to describe the position. Regarding camera orientation, a fixed perspective camera has a certain orientation. For a PTZ camera, because of its ability to rotate, a bisector 110 of the rotated angle is its orientation. For an omnidirectional camera, because it has a $2\pi$ FoV, orientation is not a factor. The orientation value is defined by the angle counterclockwise from the positive x-axis (with origin 105) to the orientation.

The spatial resolution of a camera can be converted into the FD. A higher SR requirement results in the camera having a shorter FD. One or more embodiments address the task of choosing cameras from a pool of cameras, and calculating its location and orientation in order to have a maximal coverage rate and a minimal cost.

Figure 2:
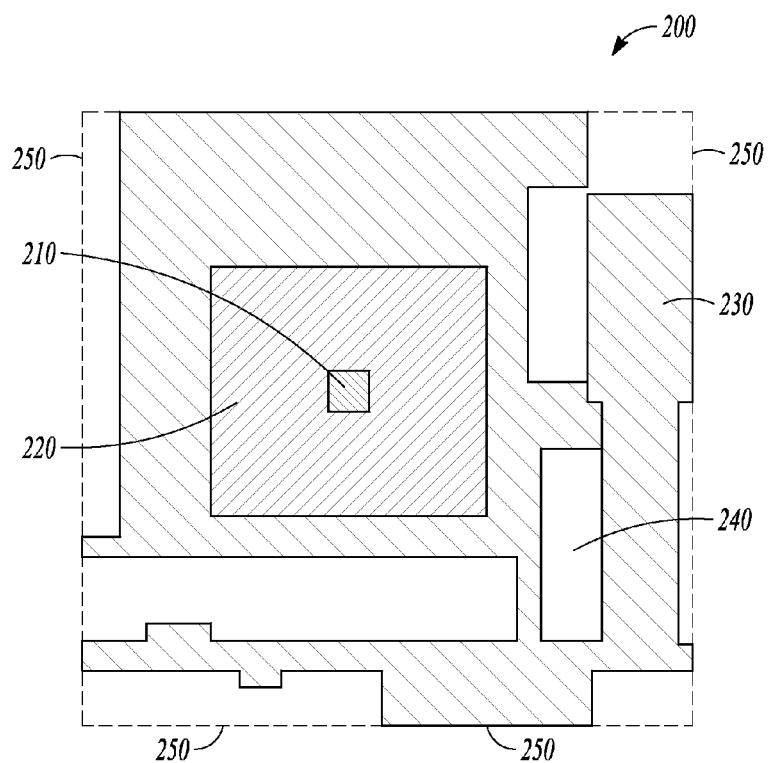
FIG. 2 is a block diagram illustrating a surveillance area, a non-surveillance area, an obstacle area, and a blank area.

An embodiment uses a description of the environment that is to be monitored. The environment is described by polygons as indicated below. An outside wall polygon (Bw) describes the border of the floor plan for an indoor surveillance system, or the border of building for an outdoor surveillance system. An outside wall polygon is illustrated in schematic 200 of FIG. 2 as 250. This information is given by a set of positions going clockwise. The area in Bw is the area in the border. Surveillance area polygons 220 (Bsi) describe the boundary of the surveillance area. In a room, a certain area might be important, and it needs to be surveyed all the time or at least a vast majority of the time. However, some areas are not that critical. The polygons are used to mark the area that needs to be surveyed. An obstacle polygon 210 (Boi) describes the border of the obstacles. There can be many obstacles in a room, such as columns and walls. A polygon describes an obstacle in the room. The area behind the obstacle cannot be seen by the camera. All the polygons are given by a set of positions in a clockwise fashion. The entire area in the 2D domain is designated as A. The area A can be divided into four parts—an obstacle area 210 ($A^o$), a surveillance area 220 ($A^s$), an area that is not under surveillance 230 ($A^n$), and blank area 240 ($A^b$) (blank area can be, for example, an atrium in a floor plan). For a point p∈ A and a polygon B, the predicate InP(B,p) is equal to the true means p is in the polygon. Otherwise, InP(B,p)=false. For these assumptions above $A^o$, $A^s$, $A^n$, $A^b$ could be defined as follows:

$$\forall p(p \in A^o) \equiv \forall p \exists i(p \in A \land InP(B_i^o, p))$$

$$\forall p(p \in A^n) \equiv \forall p \exists i(p \in A \land InP(B^w, p)) \land p \notin A^o \land \neg InP(B_i^s, p))$$

$$\forall p(p \in As) \equiv \forall p \exists i(p \in A \land InP(B_i^s, p)) \land p \notin A^o \land InP(B^w, p))$$

$$\forall p(p \in A^n) \equiv \forall p(p \in A \land p \notin A^o \land p \notin A^s \land p \notin A^n)$$

From these logical relationships, the following can be concluded:

$$A^b \cup A^o \cup A^s \cup A^n = A$$

$$A^b \cap A^o \cap A^s \cap A^n = \emptyset$$

As noted above and now as illustrated in FIG. 2, a room can be divided into an obstacle area 210, a surveillance area 220, a non-surveillance area 230, and a blank area 240. In an embodiment, it is assumed that a camera can only be placed into the surveillance area and the non-surveillance area. The task then is to maximize the coverage area of the surveillance area.

Figure 3:
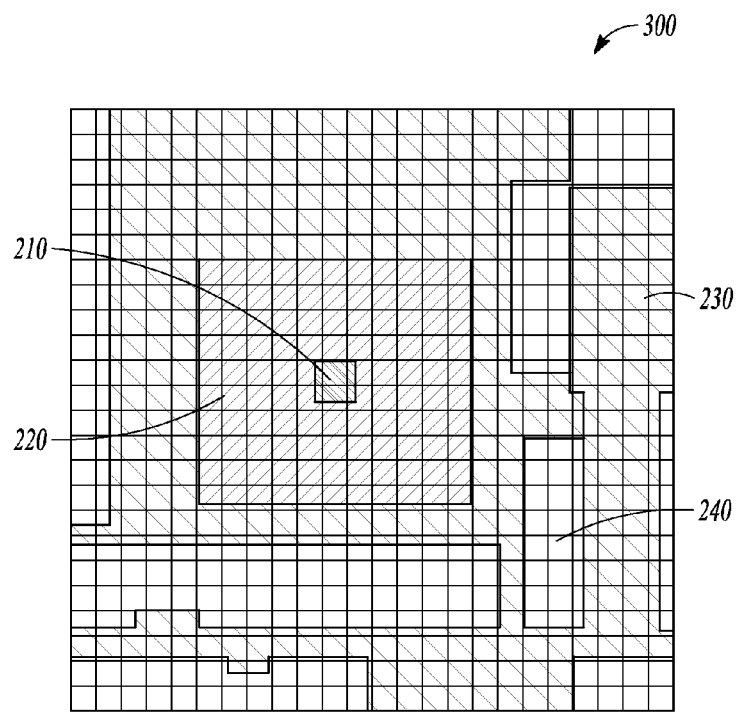
FIG. 3 illustrates a cell grid.

The optimal camera placement problem is usually intractable in the continuous domain. To make it easier, the problem can be simplified by converting the problem into the discrete domain. A cell shape is chosen to divide the region into many grids. FIG. 3 illustrates such a grid system 300, and the obstacle region 210, the surveillance region 220, the non-surveillance region 230, and the blank region 240. FIG. 3 further illustrates the area 300 divided into 6250 grids (25 times 25). With this simplification, a grid is classified into 4 types. Let Tj be the type of the grid j, and pj is the center point of the grid j.

If $pj \in A^b$, Tj=0,
If $pj \in A^o$, Tj=1,
If $pj \in A^n$, Tj=2,
If $pj \in A^s$, Tj=3.

In an embodiment, if £ is the set of all grids whose type is 3 (i.e., these grids need to be under surveillance), all the grids $g_j \in £$ that can be seen by the camera $c_i$ can be identified. If $p_j$ is the center point of the $g_j$, and $q_i$ is the position of $c_i$, then $g_j$ can be seen by the camera $c_i$ if and only if the following conditions are established. First, there should not be any obstacle between $p_j$ and $q_i$. To determine this, let L1 be the line from $p_j$ to $q_i$. Then, for any edge I2 in $B^w$, and any edge I3 in $B_i^o$, if L1 does not intersect with I2 or I3, then there is no obstacle between $c_i$ and $g_j$. This is a condition of $g_j$ for $g_j$ to be seen by the camera $c_i$.

The second condition is that a suitable distance should exist between $p_j$ and $q_i$. To determine this, $q_i$ is considered as the origin point, and $p_j$ is converted from Cartesian coordinates (x,y) to polar coordinates (r,θ). The value of r must be greater than ND and less than FD, otherwise, the grid is too far or too near to be seen.

The third condition is determined as follows. If $o_i$ is the orientation of camera i ($c_i$), and $q_i$ is considered as the origin point, $p_j$ can be converted from Cartesian coordinates (x,y) to polar coordinates (r,θ). If ρ is the angle from θ to $o_i$, then if ρ>FoV/2, $g_j$ cannot be seen. That is, ρ<FoV/2 must be true for a grid square to be visible. With the above geometry operations, it can be determined whether a grid can be seen by a camera.

Figure 4:
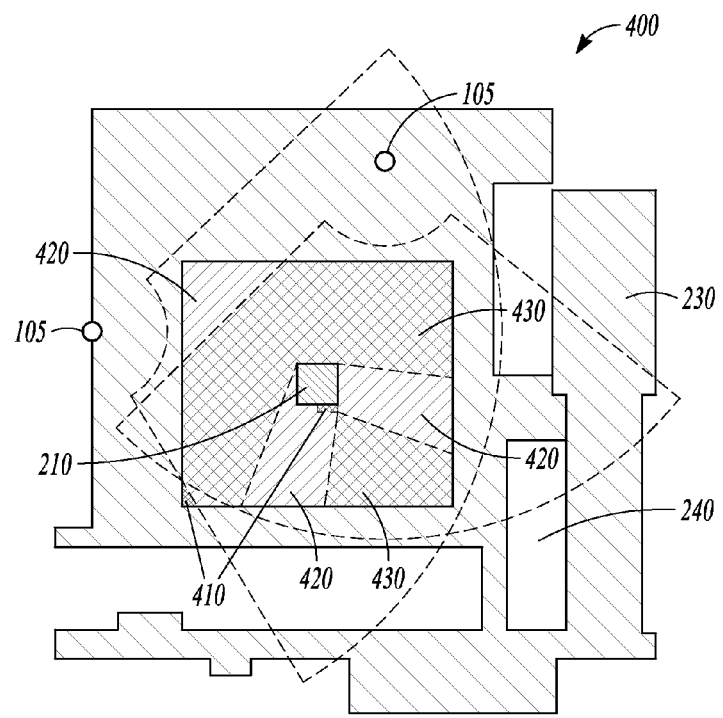
FIG. 4 illustrates the area covered by the placement of two cameras.

This is illustrated in diagrammatic form in 400 of FIG. 4. FIG. 4 illustrates a scene that has two cameras 105, the placement of which covers the area $A^s$ 0-2 times. Specifically, area 410 is not covered by any camera, area 420 is covered by one camera, and area 430 is covered by two cameras.

A genetic algorithm (GA) is a search heuristic that mimics the process of natural evolution. This heuristic is routinely used to generate useful solutions to optimization and search problems. Genetic algorithms belong to the larger class of evolutionary algorithms (EA), which generate solutions to optimization problems using techniques inspired by natural evolution, such as inheritance, mutation, selection, and crossover. Using a GA, a camera placement solution is seen as an individual. An individual comprises a set of cameras with specific intrinsic parameters (described by camera type) and extrinsic parameters (location and orientation). In other words, a solution includes the number of the cameras used in the room, and the intrinsic parameters and extrinsic parameters of each camera.

Figure 5A:
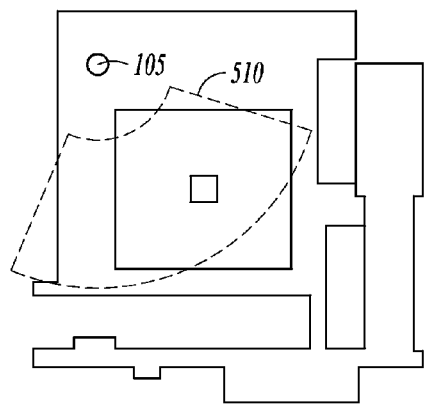
FIGS. 5A, 5B, 5C, and 5D illustrate several generations of camera selections, camera placements, and camera orientations.
Figure 5B:
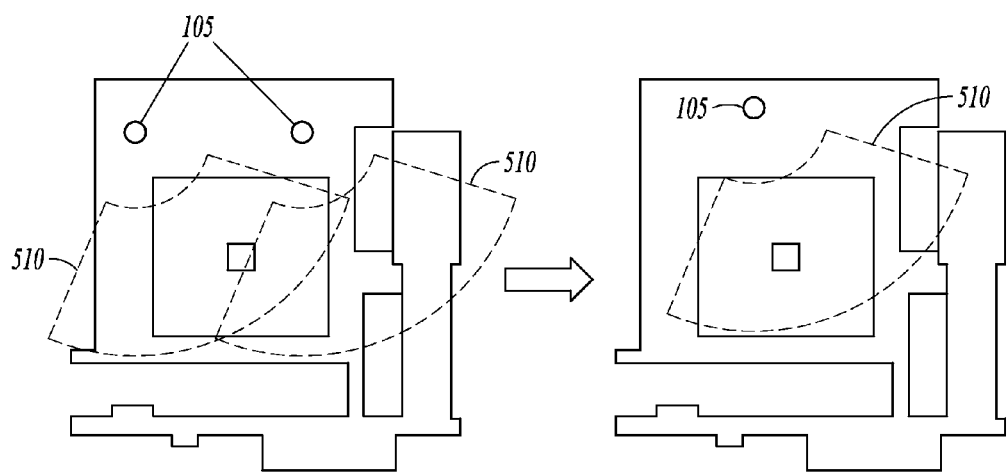
Figure 5C:
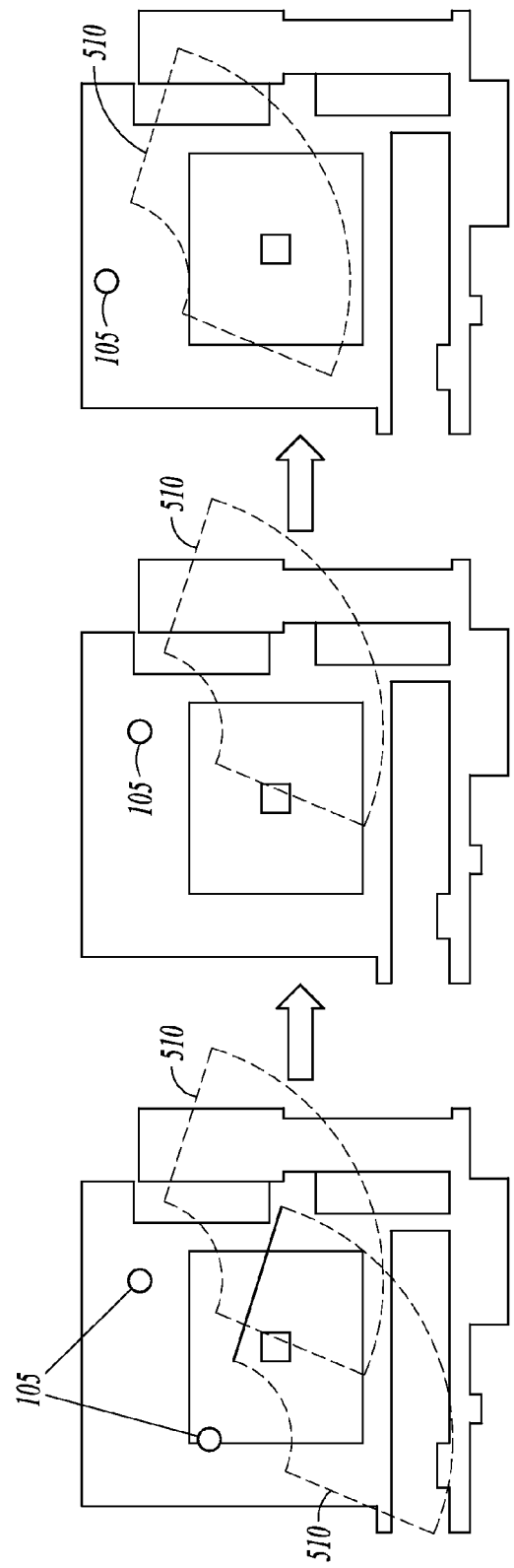
Figure 5D:
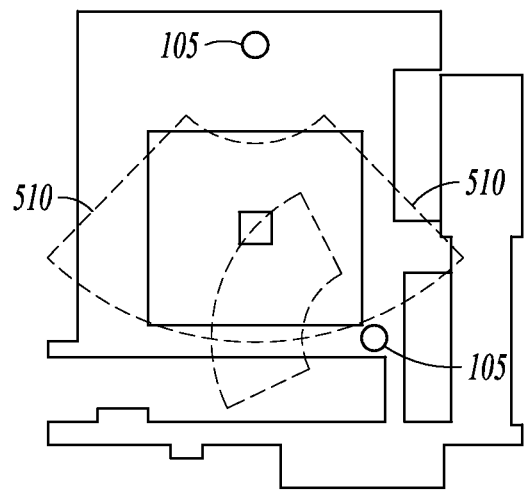

Referring to FIG. 5A, at a first generation, there is only one individual 105 in the environment with a FoV 510. After each generation, each individual would have NC children, wherein NC is the count of the children of each individual. Each child is only a slightly different from its parent or parents. After the generations, a fitness function can be defined to evaluate whether a child is a good solution. Using this fitness function, NL good children can survive, and the other children are eliminated.

After NG generations, the individuals (solutions) are more and more suitable for the particular problem at hand, and the first individual at the NG generation is the best solution for a particular automated camera placement problem. FIGS. 5A-5D show the general idea of the automated camera placement problem using a genetic algorithm. At each generation, each individual (camera 105 with field of view 510) is transformed into many individuals. This process simulates the process of natural evolution.

Figure 6:
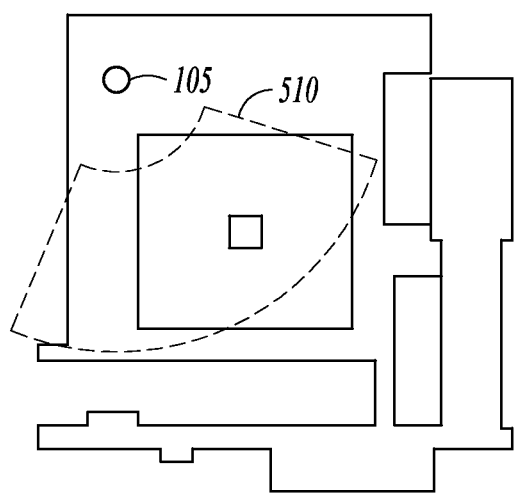
FIG. 6 illustrates the initial positioning and orientation of a camera in an area.

At the beginning, as illustrated by example in FIG. 6, the algorithm sets a random individual 105 into environment. The camera 105 has a field of view of 510. The individual has a random camera type. The camera type is defined by its intrinsic parameters. The individual also has a random position and a random orientation. In an embodiment, constraints can be added to restrict the selection of the initial individual. For example, a constraint could be that only one camera can be placed along any wall or a particular wall. The location of the camera should belong to $A^n$ or $A^s$.

At each generation, an individual would have NC children. Each child is mutated from its parents, so there would be a slight variance between the child and the parent. In an embodiment, six types of mutation are defined, which are illustrated in FIGS. 7A-7F.

Figure 7A:
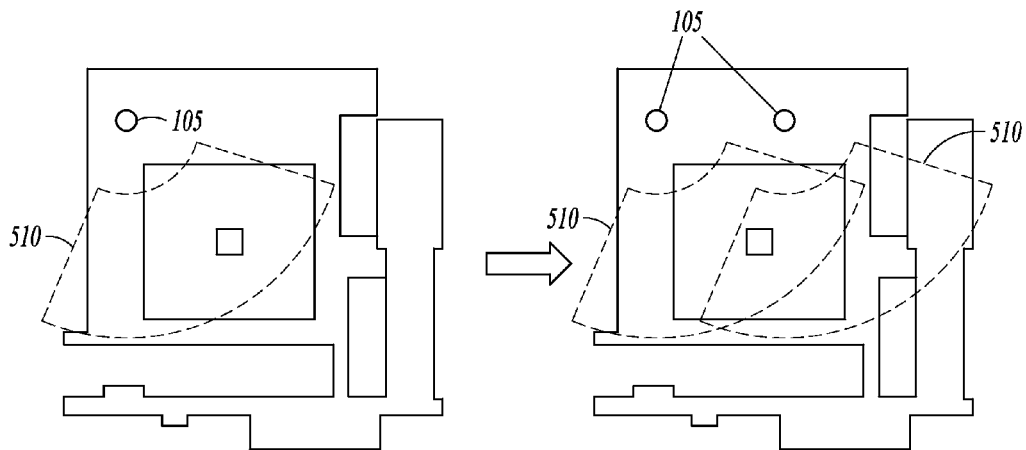
FIGS. 7A, 7B, 7C, 7D, 7E, and 7F illustrate several different types of variations of camera placement and camera orientation.

FIG. 7A illustrates the mutation of adding a camera. In this mutation, a child that mutates from a parent has a chance to add a random camera. In an embodiment, $M^a$ is the possibility of adding a camera, wherein the added camera has a random type, location, and orientation. The range of $M^a$ is from 0 to 1.

Figure 7B:
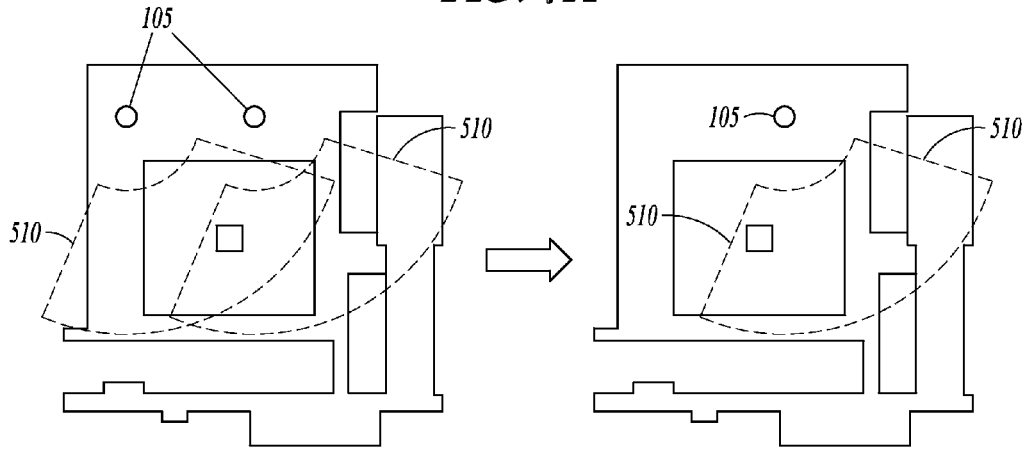

FIG. 7B illustrates the mutation of removing a random camera. If an individual has two or more cameras, it has an $M^r$ possibility of taking a random camera out of the room.

Figure 7C:
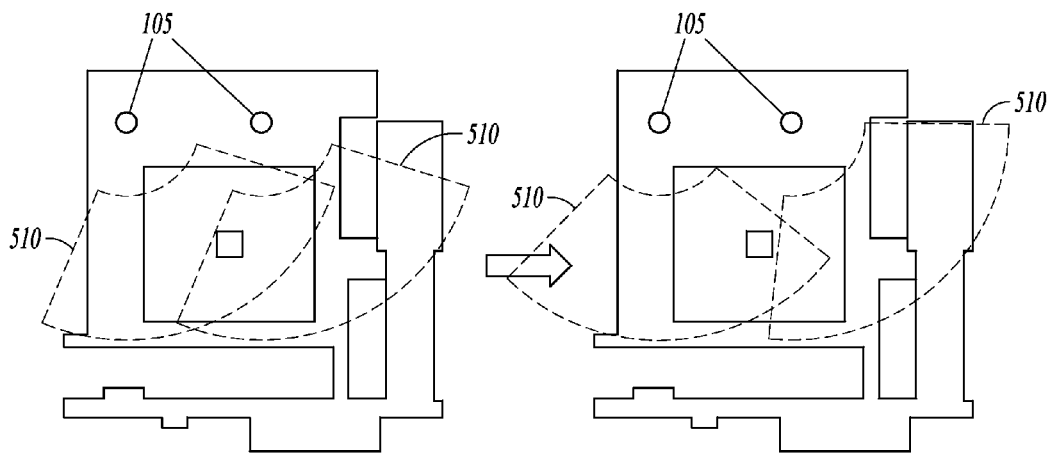

FIG. 7C illustrates the mutation of changing an orientation of a camera. $M^o$ is the change orientation parameter. A child camera inherits orientation from its parent. If o is the orientation of the parent's camera, then the orientation of child's camera is evenly or randomly distributed in the space o−Mo~o+M.

Figure 7D:
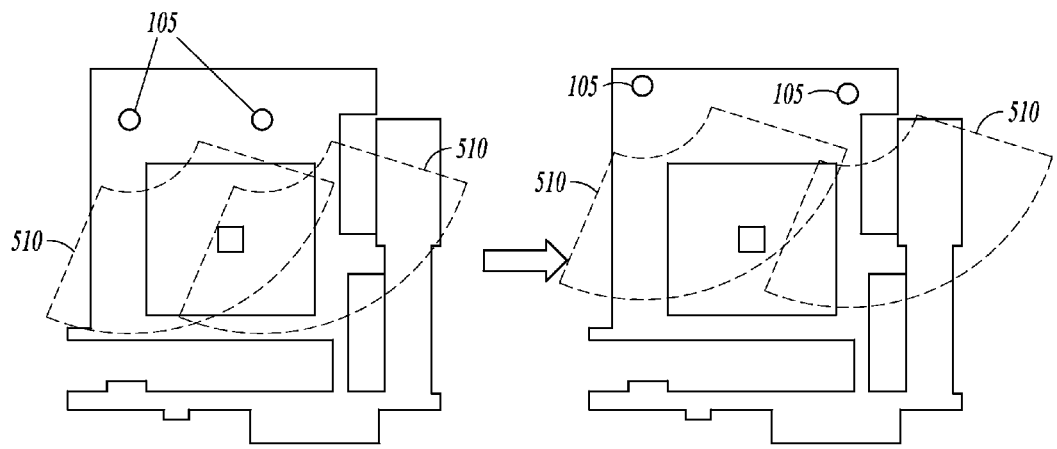

FIG. 7D illustrates the mutation of changing the location of a camera. $M^l$ is the change location parameter. A child camera inherits location from its parent. If (x,y) is the location of the parent's camera, the location of the child's camera is evenly distributed in the square whose center is (x,y) and side length is $2M^l$.

Figure 7E:
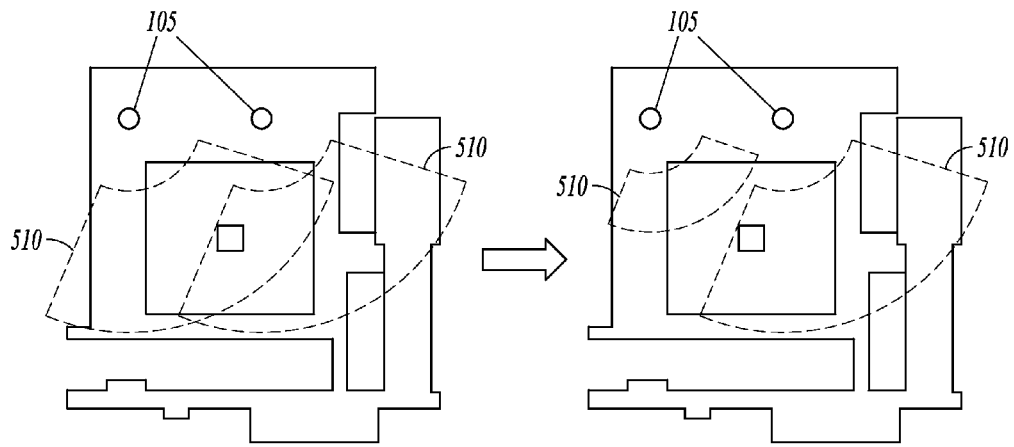

FIG. 7E illustrates the mutation of changing the type of the camera. $M^t$ is the change location parameter. That means when a camera inherits a type from its parent, it has $M^t$ possibility to change its type. For example, a short focal length camera may be changed into a long focal length camera.

Figure 7F:
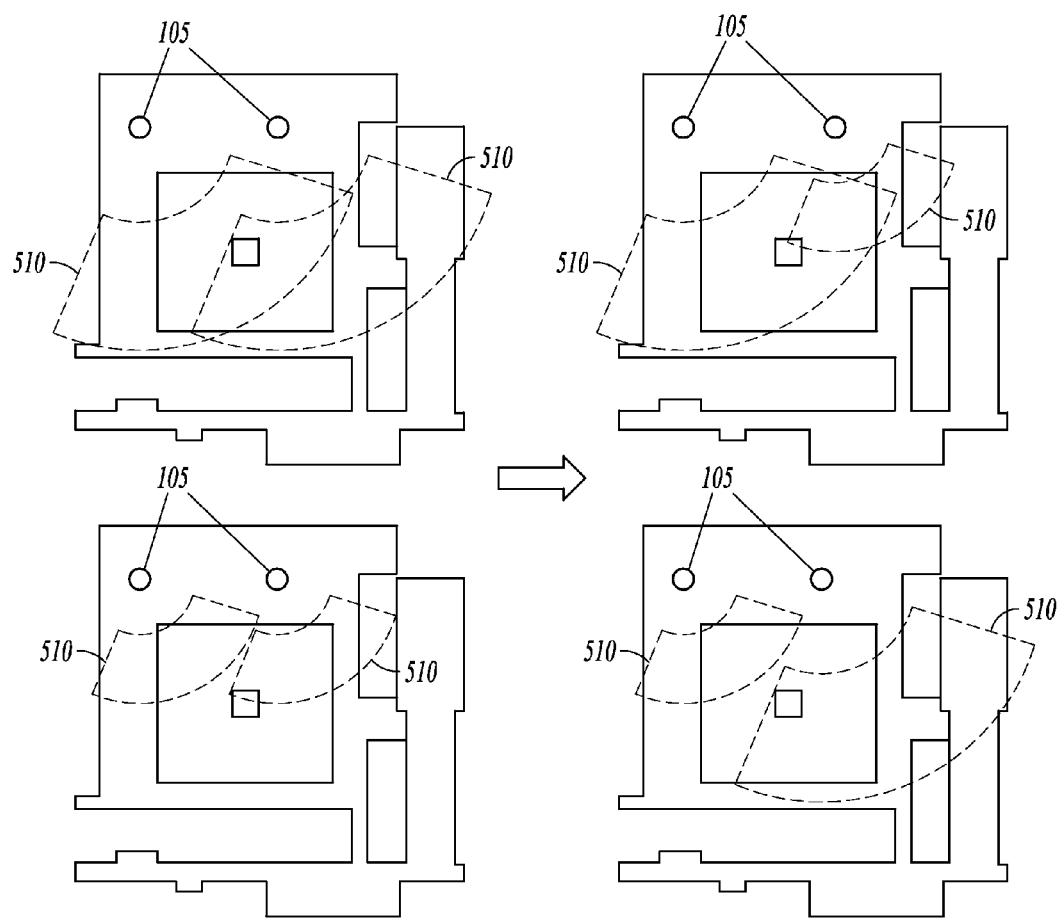

From these five types of mutations that are illustrated in FIGS. 7A-7E, it can be concluded that all the camera's attributes are inherited from only one parent. It is like the parthenogenesis in nature. However, FIG. 7F illustrates a type of bisexual reproduction, referred to as crossover. In crossover, a child can have two parents. It is like the mating in nature. $M^m$ is the parameter of crossover, an individual can have an $M^m$ chance to mate with another individual. When individual A is mating with individual B, one or more their cameras are exchanged and two children are generated.

After mutation, NL individuals generate NL×NC children, but only NL children survive in the list. An embodiment designs a fitness function to describe whether an individual is suitable for the environment. Two parameters can be evaluated for an individual I—the total cost of the individual C and the coverage rate of the individual S. C is the sum of the cost of all cameras in I. If the count of grids in £ is n, and the covered grids count is m, then S=m/n. The value range of S is [0, 1]. Parameter S could be determined by the algorithm described above that determines if a grid will be visible to a camera or not.

In an embodiment, the fitness function could be represented as f(S, C). C can be thought of as inversely proportional to f. That means that $$\frac{\partial f(S, C)}{\partial C} + -K_1 \frac{1}{C^2}$$

and then f(S,C)=f1(S)+f2(S)×$K_1$/C+c, where c is a constant.

Focused the parameter S, when S is small, coverage rate is the most important of all. So let f2(S,C)=f(S,C)=−$K_2$/S+f3(C). But when S is larger the average cost of each grid is more and more important. Average cost is proportional to f, That is means $$\frac{\partial f(S, C)}{\partial C} = Kc$$

and also let f1(S)=f(S,C)=$K_3$×S×f4(C)+f5(C)+c.

Focused on these requirements, we design fitness function as below:

$$g(S,C) = -K_2(1-S)/S + K_3 \times S/C$$

In general, when S is small, g(S,C) is close to f2, and with the increase of S, g(S,C) is close to f2. K2 and K3 are two important weights. The larger K2 means coverage rate is more important while larger K3 means average cost is more important. Using this fitness function, all the children can be evaluated and then sorted by the descending value of the key of the fitness function. In an embodiment, only the top NL of these children are reserved. This feature simulates the natural process of elimination.

Figure 8:
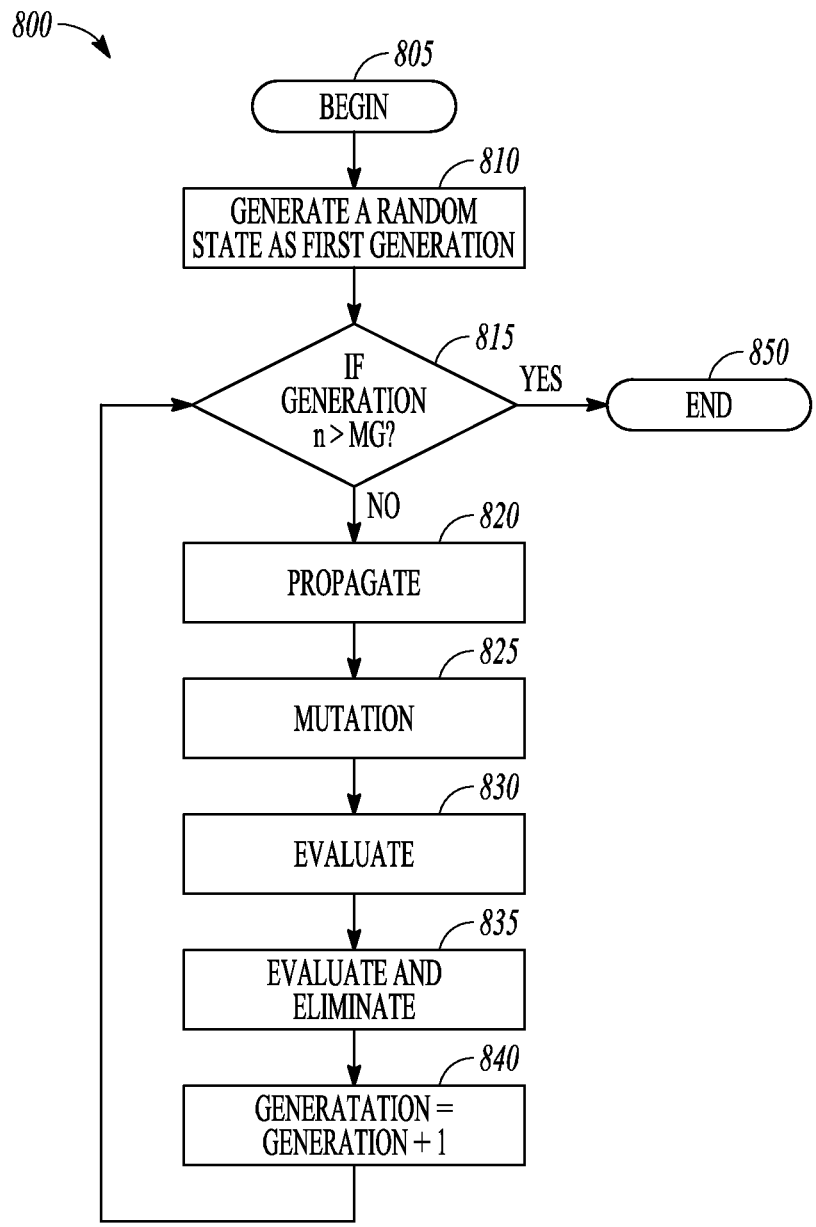
FIG. 8 is a flowchart of an example embodiment of a genetic algorithm that can be used in connection with camera selection, camera placement, and camera orientation.
Figure 9A:
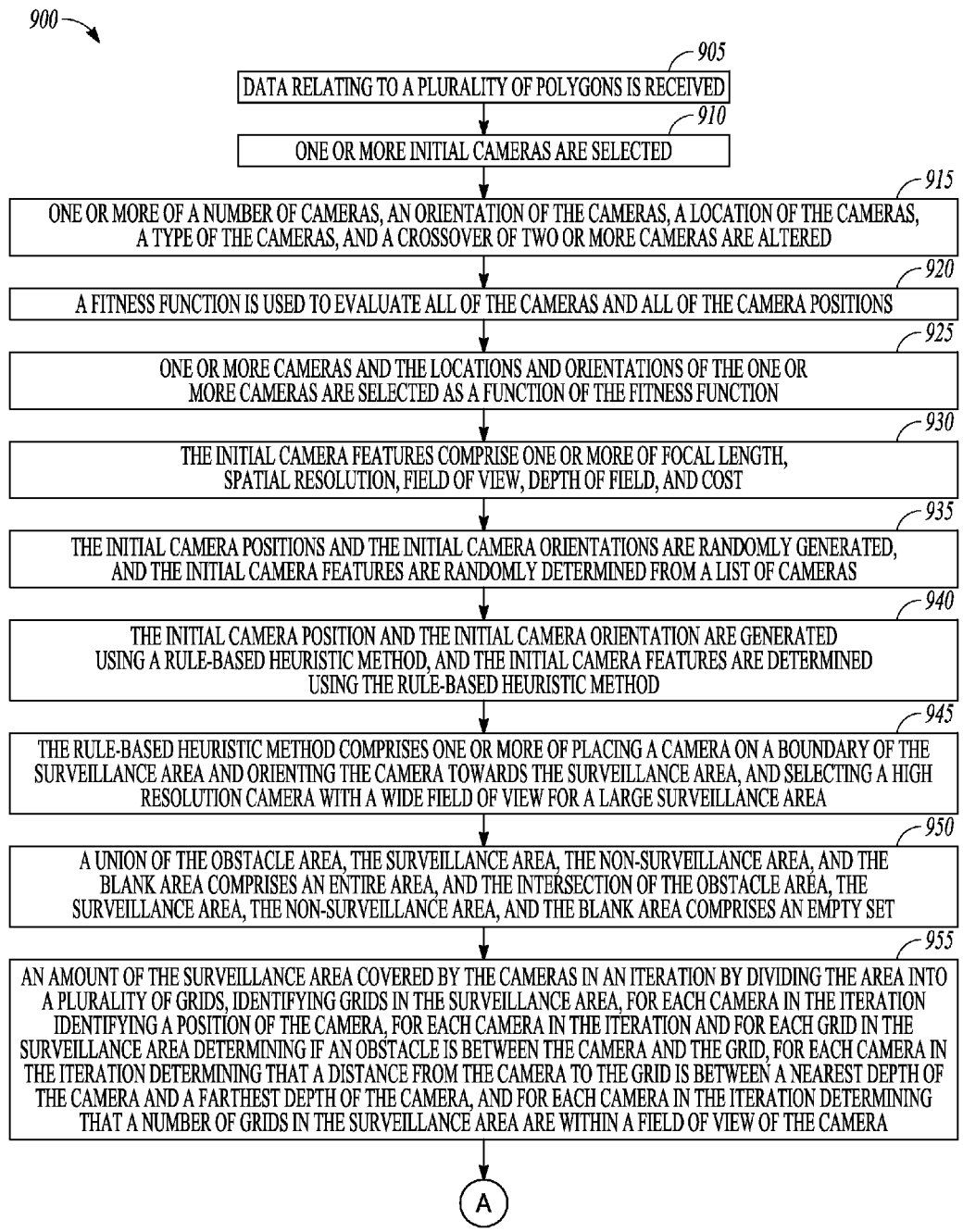
FIGS. 9A and 9B are a flowchart of another example embodiment of a genetic algorithm that can be used in connection with camera selection, camera placement, and camera orientation.
Figure 9B:
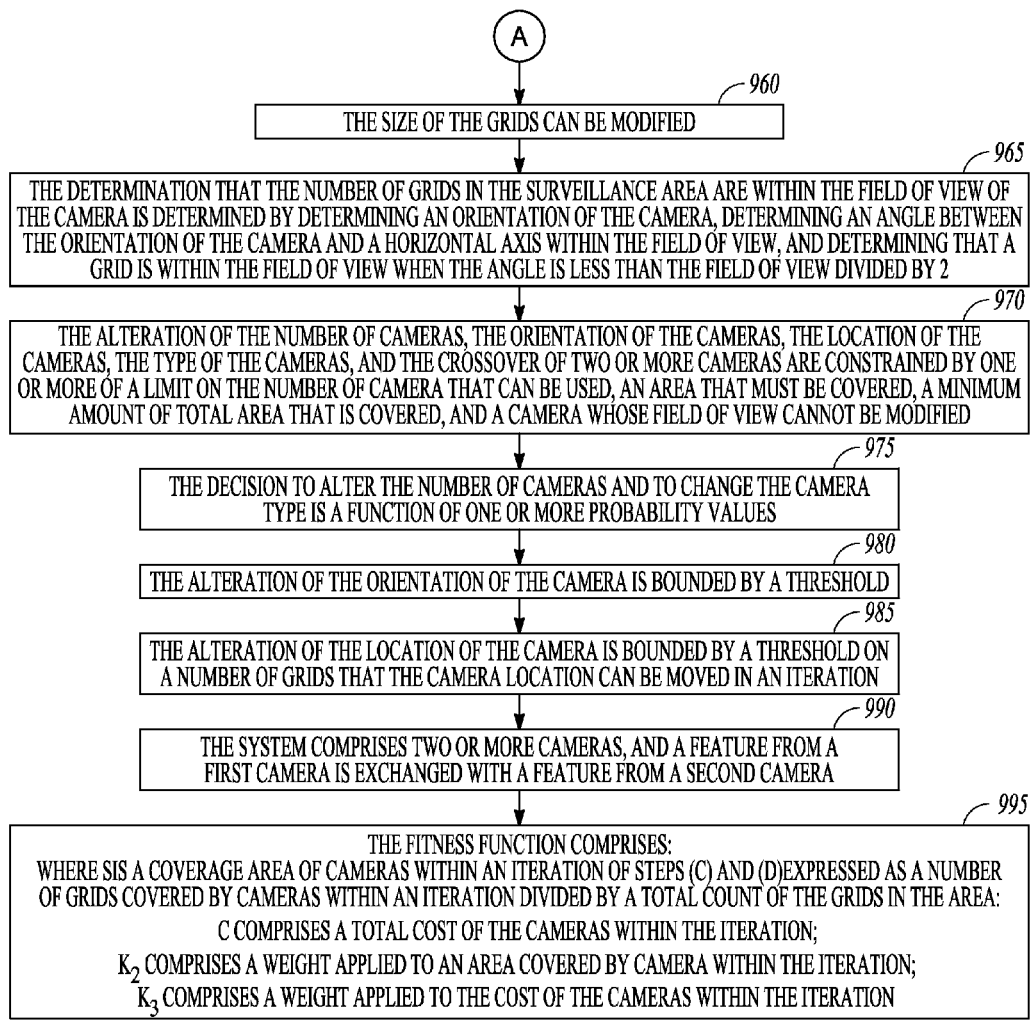
Figure 10:
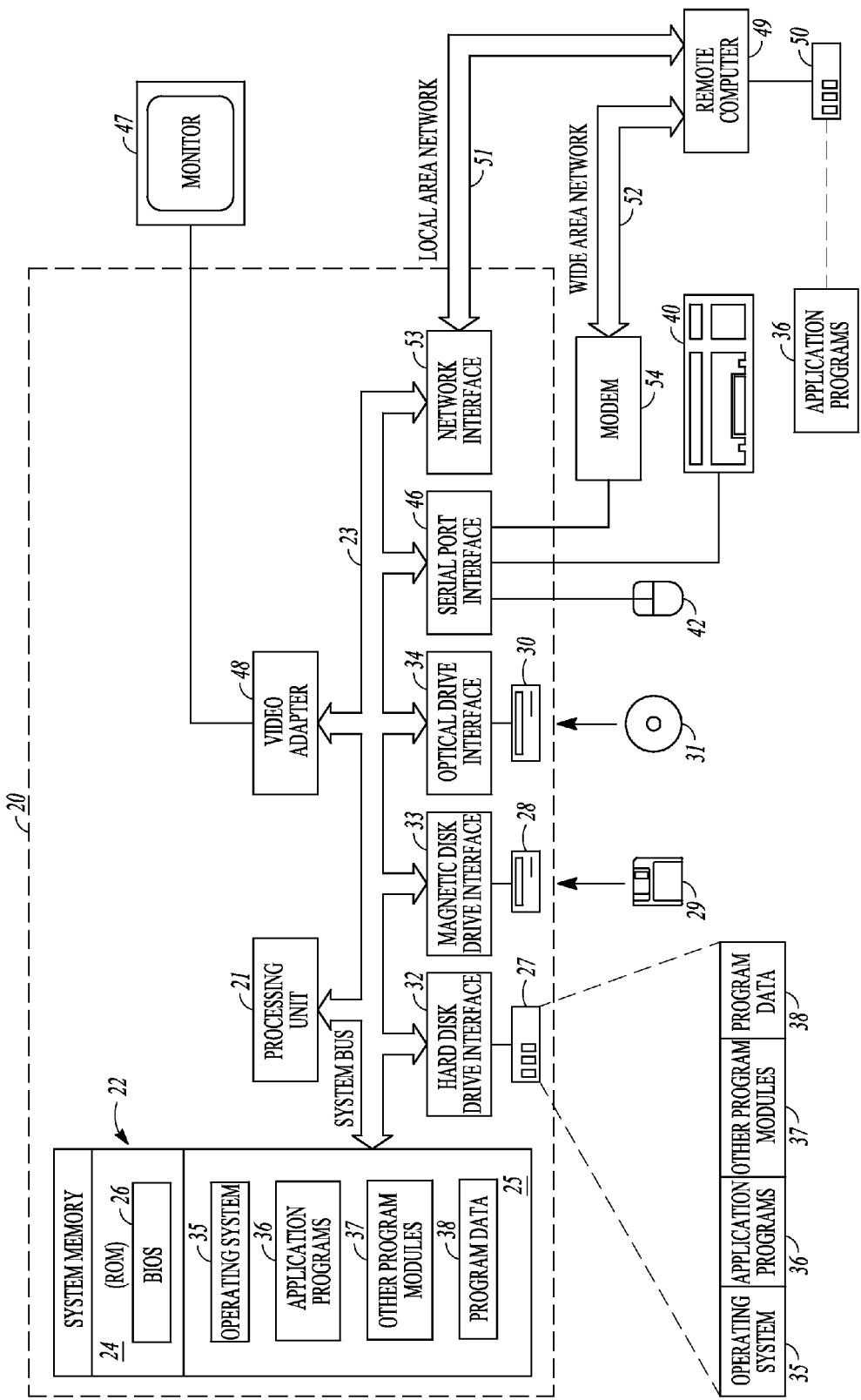
FIG. 10 illustrates an example embodiment of a computer processing system upon which an embodiment of the current disclosure can execute.

FIGS. 8, 9A and 9B are flowcharts of example processes 800 and 900 for solving a camera placement problem using a genetic algorithm. FIGS. 8, 9A, and 9B include a number of process blocks 805-850 and 905-995 respectively. Though arranged serially in the example of FIGS. 8, 9A, and 9B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

FIG. 8 is a flow chart illustrating the implementation 800 of this genetic algorithm. The process begins at 805, and can include such things as initialization, loading the polygons (rooms, surveillance region, and obstacles), and dividing the whole region into many grids, and calculating the set of grids £. At 810, a random state is generated as the first generation. That is, a random camera is generated as an individual in the environment. At 815, if the generation number is greater than a maximum generation threshold, then the process terminates at 850. If the maximum generation threshold has not been met, then the individuals propagate at 820. This involves copying the entire individual in the environment NC times. It simulates the natural process of propagation. At 825, all the individuals in the environment are mutated. At 830 and 835, a fitness function is used to evaluate all the individuals, sort the individuals, and reserve only the top NL individuals. At 840, the generation number is incremented, and if it is not larger than the maximum generation, the process continues at 820. The process terminates at 850 when the maximum generation is reached, and the first individual in the current generation is the best solution.

FIGS. 9A and 9B are a flow chart illustrating another example embodiment of the use of a genetic algorithm to solve a camera placement problem. At 905, data relating to a plurality of polygons is received. The polygons represent one or more of a surveillance area, a non-surveillance area, a blank area, and an obstacle. At 910, one or more initial cameras are selected. The selection of the initial cameras includes one or more initial camera positions, initial camera orientations, and initial camera features. The initial camera positions and the initial camera orientations cause one or more fields of view of the initial cameras to cover at least a part of the surveillance area. At 915, one or more of a number of cameras, an orientation of the cameras, a location of the cameras, a type of the cameras, and a crossover of two or more cameras are altered. At 920, a fitness function is used to evaluate all of the cameras, including the features of the cameras and the coverage areas of the cameras. At 925, one or more cameras and the locations and orientations of the one or more cameras are selected as a function of the fitness function.

At 930, the initial camera features comprise one or more of focal length, spatial resolution, field of view, depth of field, and cost. At 935, the initial camera positions and the initial camera orientations are randomly generated, and the initial camera features are randomly determined from a list of cameras. At 940, the initial camera position and the initial camera orientation are generated using a rule-based heuristic method, and the initial camera features are determined using the rule-based heuristic method. At 945, the rule-based heuristic method comprises one or more of placing a camera on a boundary of the surveillance area and orienting the camera towards the surveillance area, and selecting a high resolution camera with a wide field of view for a large surveillance area. At 950, a union of the obstacle area, the surveillance area, the non-surveillance area, and the blank area comprises an entire area, and the intersection of the obstacle area, the surveillance area, the non-surveillance area, and the blank area comprises an empty set.

At 955, an amount of the surveillance area covered by the cameras in an iteration by dividing the area into a plurality of grids, identifying grids in the surveillance area, for each camera in the iteration identifying a position of the camera, for each camera in the iteration and for each grid in the surveillance area determining if an obstacle is between the camera and the grid, for each camera in the iteration determining that a distance from the camera to the grid is between a nearest depth of the camera and a farthest depth of the camera, and for each camera in the iteration determining that a number of grids in the surveillance area are within a field of view of the camera.

At 960, the size of the grids can be modified. At 965, the determination that the number of grids in the surveillance area are within the field of view of the camera is determined by determining an orientation of the camera, determining an angle between the orientation of the camera and a horizontal axis within the field of view, and determining that a grid is within the field of view when the angle is less than the field of view divided by 2. At 970, the alteration of the number of cameras, the orientation of the cameras, the location of the cameras, the type of the cameras, and the crossover of two or more cameras are constrained by one or more of a limit on the number of camera that can be used, an area that must be covered, a minimum amount of total area that is covered, and a camera whose field of view cannot be modified.

At 975, the decision to alter the number of cameras and to change the camera type is a function of one or more probability values. At 980, the alteration of the orientation of the camera is bounded by a threshold. At 985, the alteration of the location of the camera is bounded by a threshold on a number of grids that the camera location can be moved in an iteration. At 990, the system comprises two or more cameras, and a feature from a first camera is exchanged with a feature from a second camera. At 995, the fitness function comprises:

$$g(S,C) = -K_2(1-S)/S + K_3 \times S/C$$

wherein S is a coverage area of the cameras within an iteration of steps (c) and (d) expressed as a number of grids covered by the cameras within an iteration divided by a total count of the grids in the area;

C comprises a total cost of the cameras within the iteration;

$K_2$ comprises a weight applied to an area covered by the cameras within the iteration; and $K_3$ comprises a weight applied to the cost of the cameras within the iteration.

For an existing surveillance system, it is necessary to evaluate its current camera placement and then optimize those current cameras to arrive at a better surveillance solution and avoid or minimize reinstallation costs. Sometimes, cameras need to be added to an existing system to improve the security or change the region of interest or its priority. In these cases, it is also important to optimize the parameters of existing cameras with constraints, such as fixing the location, and/or to install the new additional or replacement cameras for better surveillance performance. The other possible constraints may be (1) with specific number of camera and its capability, to get the maximal coverage area; (2) with critical waypoint and coverage area, to get the optimal cost; (3) and to optimize the camera parameters to auto sweep. The optimal parameter for the above situation can be solved with the above genetic algorithm or constraints programming method, especially using nonlinear programming. A heuristic rule based method can also be introduced to select the initial camera placement for the above-described genetic algorithm or constraints programming method so as to speed up these algorithms or decrease the iteration steps to meet the surveillance requirement. Any reasonable rule can be adopted, such as put the camera along the wall and orient it to the region of interest, or orient the camera to the entrance.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A system comprising:
   one or more computer processors configured to:
   (a) receive data relating to a plurality of polygons, the polygons representing one or more of a surveillance area, a non-surveillance area, a blank area, and an obstacle;
   (b) select one or more initial cameras, including one or more initial camera positions, initial camera orientations, and initial camera features, wherein the initial camera positions and the initial camera orientations cause one or more fields of view of the initial cameras to cover at least a part of the surveillance area;
   (c) alter one or more of a number of cameras, an orientation of the cameras, a location of the cameras, a type of the cameras, and a crossover of two or more cameras;
   (d) use a fitness function to evaluate all of the cameras, including the features of the cameras and the coverage areas of the cameras; and
   (e) select one or more cameras and the locations and orientations of the one or more cameras as a function of the fitness function.

2. The system of claim 1, wherein the initial camera features comprise one or more of focal length, spatial resolution, field of view, depth of field, and cost.

3. The system of claim 1, wherein the initial camera positions and the initial camera orientations are randomly generated; and
   the initial camera features are randomly determined from a list of cameras.

4. The system of claim 1, wherein the initial camera position and the initial camera orientation are generated using a rule-based heuristic method; and
   the initial camera features are determined using the rule-based heuristic method.

5. The system of claim 4, wherein the rule-based heuristic method comprises one or more of placing a camera on a boundary of the surveillance area and orienting the camera towards the surveillance area, and selecting a high resolution camera with a wide field of view for a large surveillance area.

6. The system according to claim 1, wherein a union of the obstacle area, the surveillance area, the non-surveillance area, and the blank area comprises an entire area, and the intersection of the obstacle area, the surveillance area, the non-surveillance area, and the blank area comprises an empty set.

7. The system of claim 1, comprising iterating steps (c)-(e) a plurality of times.

8. The system of claim 7, wherein the one or more computer processors are configured to determine an amount of the surveillance area covered by the cameras in an iteration by:
dividing the area into a plurality of grids;
identifying grids in the surveillance area;
for each camera in the iteration, identifying a position of the camera;
for each camera in the iteration and for each grid in the surveillance area,
determining if an obstacle is between the camera and the grid;
for each camera in the iteration, determining that a distance from the camera to the grid is between a nearest depth of the camera and a farthest depth of the camera; and
for each camera in the iteration, determining that a number of grids in the surveillance area are within a field of view of the camera.

9. The system of claim 8, wherein a size of the grids can be modified.

10. The system of claim 8, wherein the determining that the number of grids in the surveillance area are within the field of view of the camera is determined by:
determining an orientation of the camera;
determining an angle between the orientation of the camera and a horizontal axis within the field of view; and
determining that a grid is within the field of view when the angle is less than the field of view divided by 2.

11. The system of claim 1, wherein the alteration of the number of cameras, the orientation of the cameras, the location of the cameras, the type of the cameras, and the crossover of two or more cameras is constrained by one or more of a limit on the number of camera that can be used, an area that must be covered, a minimum amount of total area that is covered, and a camera whose field of view cannot be modified.

12. The system of to claim 1, wherein the decision to alter the number of cameras and to change the camera type is a function of one or more probability values.

13. The system of claim 1, wherein the alteration of the orientation of the camera is bounded by a threshold.

14. The system of claim 1, wherein the alteration of the location of the camera is bounded by a threshold on a number of grids that the camera location can be moved in an iteration of steps (c) and (e).

15. The system of claim 1, wherein the system comprises two or more cameras, and wherein a feature from a first camera is exchanged with a feature from a second camera.

16. The system of claim 1, wherein the fitness function comprises:

$$g(S,C) \square \square K_2 (1 \square \square S)/S \square \square K_3 \square \square S/C$$

wherein S is a coverage area of the cameras within an iteration of steps (c) and (e) expressed as a number of grids covered by the cameras within the iteration of steps (c) and (e) divided by a total count of the grids in the area;
C comprises a total cost of the cameras within the iteration of steps (c) and (e);
$K_2$ comprises a weight applied to an area covered by the cameras within the iteration of steps (c) and (e); and
$K_3$ comprises a weight applied to the cost of the cameras within the iteration of steps (c) and (e).

17. A process comprising:
(a) receiving into a computer processor data relating to a plurality of polygons, the polygons representing one or more of a surveillance area, a non-surveillance area, a blank area, and an obstacle;
(b) selecting using the computer processor one or more initial cameras, including one or more initial camera positions, initial camera orientations, and initial camera features, wherein the initial camera positions and the initial camera orientations cause one or more fields of view of the initial cameras to cover at least a part of the surveillance area;
(c) altering using the computer processor one or more of a number of cameras, an orientation of the cameras, a location of the cameras, a type of the cameras, and a crossover of two or more cameras;
(d) using a fitness function to evaluate all of the cameras, including the features of the cameras and the coverage areas of the cameras; and
(e) selecting using the computer processor one or more cameras and the locations and orientations of the one or more cameras as a function of the fitness function.

18. The process of claim 17, comprising generating the initial camera position and the initial camera orientation using a rule-based heuristic method and determining the initial camera features using the rule-based heuristic method; wherein the rule-based heuristic method comprises one or more of placing a camera on a boundary of the surveillance area and orienting the camera towards the surveillance area, and selecting a high resolution camera with a wide field of view for a large surveillance area.

19. A non-transitory computer-readable medium comprising instructions that when executed by a processor execute a process comprising:
(a) receiving into a computer processor data relating to a plurality of polygons, the polygons representing one or more of a surveillance area, a non-surveillance area, a blank area, and an obstacle;
(b) selecting using the computer processor one or more initial cameras, including one or more initial camera positions, initial camera orientations, and initial camera features, wherein the initial camera positions and the initial camera orientations cause one or more fields of view of the initial cameras to cover at least a part of the surveillance area;
(c) altering using the computer processor one or more of a number of cameras, an orientation of the cameras, a location of the cameras, a type of the cameras, and a crossover of two or more cameras;
(d) using a fitness function to evaluate all of the cameras, including the features of the cameras and the coverage areas of the cameras; and
(e) selecting using the computer processor one or more cameras and the locations and orientations of the one or more cameras as a function of the fitness function.

20. The non-transitory computer-readable medium of claim 19, comprising iterating steps (c)-(e) a plurality of times; and determining an amount of the surveillance area covered by the cameras in an iteration by:
dividing the area into a plurality of grids;
identifying grids in the surveillance area;
for each camera in the iteration, identifying a position of the camera;
for each camera in the iteration and for each grid in the surveillance area, determining if an obstacle is between the camera and the grid;

for each camera in the iteration, determining that a distance from the camera to the grid is between a nearest depth of the camera and a farthest depth of the camera; and for each camera in the iteration, determining that a number of grids in the surveillance area are within a field of view of the camera.

\* \* \* \* \*